Patented June 24, 1941

2,247,205

UNITED STATES PATENT OFFICE 2,247,205

MOLDED LIGNOCELLULOSIC PRODUCT

Arlie W. Schorger and John H. Ferguson, Madison, Wis., assignors to Burgess Cellulose Company, Freeport, Ill., a corporation of Delaware No Drawing. Original application January 13, 1938, Serial No. 184,768. Divided and this application September 12, 1938, Serial No. 229,526

10 Claims. (Cl. 106—199)

This invention relates to a method for rendering more plastic and water resistant by means of oils and waxes, the plastic lignocellulosic products resulting from the treatment of natural lignocelluloses by simple cooking, washing and drying operations, the resultant material being capable of being hot-molded to form hard resinous thermo-plastic materials. The invention also relates to the resultant product.

This application is a division of Serial No. 184,768, filed January 13, 1938.

It is an object of this invention to improve the prior processes for making the plastic lignocellulose products referred to above and products formed thereby, to render the products more plastic, stronger and more water-resistant.

Briefly, the primary process consists in cooking a natural lignocellulosic material with water, alone or with added materials, within a limited range of temperatures and for a predetermined time to render water-soluble a part of the lignocellulosic material and to particularly dissolve the hemicelluloses. The residual product, after extraction of the water solubles and subsequent drying, contains a large part of the original thermoplastic resinous lignin, as well as cellulosic fibre intrinsically unchanged. This product may be hot-molded under pressure but without the addition of a binder, into a hard, resinous product having a high strength and a high resistance to the absorption of water.

The raw material for the process is any natural lignocellulosic material such as wood, corn cobs, straw, bagasse, corn stalks, etc. When a natural lignocellulosic material is referred to herein it includes manufactured products such as newsprint containing, for example, 70%–90% of coniferous ground wood. The ground wood therein is substantially in its original or natural condition.

The lignocellulosic material, after being ground or otherwise comminuted, is cooked at elevated temperatures with water, preferably containing a buffer, or a potential buffer, salt, or mixture of such salts, the purpose of which is to continuously neutralize the acids produced from the hydrolytic fission and at the same time form with these acids other salts which act in a buffer capacity. Part of the hemicelluloses or other binding materials are thereby dissolved. The time, temperature, and pressure used during the cooking operation may vary within limits depending upon the specific properties desired in the final product.

Although water alone may be used during the cooking operation, a small amount of buffers, or active chemicals producing buffers, should be added during the cook to neutralize the acetic and other acids split off from the wood, and thereby form salts of these acids which further control the process by preventing too much cellulose degradation, yet allowing hemicellulose hydrolysis. This is accomplished by adding basic chemicals to the cook such as lime, other alkaline earth hydroxides, calcium carbonate or other alkaline earth carbonates, alkali carbonates, alkali triphosphate, etc. The amount should be such that the cook is slightly acid at the end of the cooking operation, usually having a pH of 5.0 to 6.0. If more alkali is used than is necessary to neutralize the acid formed the lignin may be attacked thereby decreasing the amount of binder available in the molding compound. Continuous neutralization during the cooking process is desirable to secure a well-flowed, water-resistant and strong product.

The cooking temperature and the cooking time are closely related insofar as the strength of the molded product is concerned. The presence of moisture in the molding compound during the molding operation affects appreciably the properties of the molded product. The hydrogen ion concentration during the molding operation also is a factor. If the water absorption of the molded product is unimportant then cooking temperatures (one hour cooking time) of from 135° to 185° C. with hardwood sawdust give the best results. In a specific instance a one hour cook at 135° C. gave a product having its maximum strength when molded dry. When molded moist the maximum strength resulted when the hardwood sawdust was cooked at a temperature of 155° C. With the cooking time decreased to 15 minutes and a cooking temperature of as high as 195° C. a molded product resulted which had excellent strength, though the maximum strength resulted with material cooked at from 165° C. to 190° C. This product which had been cooked 15 minutes, when molded dry had substantially greater strength than that which was molded moist.

The water absorption and extent of flow of the molded product appear to be more closely related to the cooking temperatures and pressures than does its strength. Tests indicate that the maximum resistance to moisture is developed when the cooking temperature, using hardwood sawdust as the lignocellulosic material, is from 180° C. to 195° C. regardless of whether the cooking time is 15 minutes or one hour though these variables in themselves affect the water absorption.

For example, the moisture resistance of a moist-molded product decreases rapidly as the cooking temperature decreases below 165° C. with a cooking time of one hour. If the same material is dry-molded the water resistance is substantially less and decreases rapidly at cooking temperatures below 165° C. The same material cooked for 15 minutes and moist-molded has an excellent water resistance when cooked at temperatures above 185° C. but at temperatures somewhat below this disintegrates upon being immersed in water for several days. If dry-molded this product exhibits less water resistance but greater strength. Cooking at above about 195° C. apparently affects the strength adversely but improves the water resistance, though each natural lignocellulosic material has its particular characteristics, and variations from the above data may be expected for the various raw materials. In general, it is usual to cook at 180° C. for 30 to 60 minutes for optimum results.

During the cooking operation a part of the hemicelluloses and other constituents of the wood are dissolved. From 20% to 50% of the natural lignocelluloses are dissolved, 30% being about the average for wood. Corn cobs lose about 50% in weight on cooking at 185° C. for 1 hour; newsprint loses about 23% under the same conditions, and straw about 44%.

After the cooking operation is completed the cooked product is washed with water to remove substantially all of the parts rendered water-soluble. The wet pulp, which is dark brown in color, is then dried. When dried at 110° C. less than 1% of moisture remains, usually from 0.50% to 0.75%. The dried product, called the "primary material," is disintegrated in a mill to a powder which should pass through at least a 40-mesh screen and preferably a finer screen. The 65 mesh material gives excellent results. Thus, when powdered it is in a form for use as a molding compound either alone or in combination with, for example, other organic materials. The primary material thus made consists of a filler and a binder. The filler is largely the cellulose of the lignocellulosic raw material. The binder is primarily the substance resulting from the action of water on the lignin during the cooking operation. Other fillers and binders may be added to the primary material.

This molding-powder is plastic under hot-molding conditions and is well suited to molding operations. A small amount of moisture, usually 1.0% or more, present in the powder is advantageous since the powder is rendered more plastic and the moisture resistance is increased as hereinbefore explained. The primary product may be molded at a pressure of 1600 to 5000 pounds per square inch, a pressure of 3000 pounds being a favorable one. While it is maintained at an elevated temperature, usually above 100° C. A favorable temperature is 185° C., though temperatures of over 200° C. may be used. The molding time should be sufficient to produce the desired hard and resinous properties, 2 to 15 minutes usually sufficing for small objects. The material is preferably molded by giving it a preliminary cold press in the mold at high pressure, 6000 to 7000 pounds per square inch, and then dropping the pressure. The mold is then heated. As the product heats the pressure again rises. After being subjected to the desired pressure as hereinbefore specified for the necessary time, the mold may be cooled while maintaining some pressure. Hot or cold ejection is used.

The resultant product is hard, has a resinous appearance, remains thermoplastic and has many of the properties of products made by molding mixtures of a resin such as Bakelite and a filler such as wood flour. The moisture absorption is very low, for example, usually less than 2% when a 2 inch disk $\tfrac{3}{32}$ inch in thickness is immersed in water for 18 hours at room temperatures. The modulus of rupture varies with the different materials. In a specific example it was 7000 pounds per square inch when molded with a small amount of water and 8400 pounds per square inch when molded dry. The density varied from 1.40 to 1.45. The best results are obtained if the hydrogen ion concentration of the primary product is controlled during molding by the addition of a buffer such as sodium acetate.

A small amount of zinc stearate, for example, 1%, may be mixed with the molding-powder to secure better release in the mold. The zinc stearate acts as a lubricant and also aids the water resistance.

Phenols or organic amines may be incorporated with the primary product before molding to increase the water resistance, plasticity and strength of the molded product. The plasticity of the dried product is particularly increased thereby. A mixture of a phenol and an organic amine appears to be more desirable than an equal amount of either one alone since the plasticity and strength are increased. Phenols which may be used are phenol, nitrophenol, o-, m-, and p-cresol, alpha- and beta-naphthol, catechol, pyrogallol, and p-aminophenol. Amines, both aliphatic and aromatic, which may be used are aniline, dimethyl aniline, o-, m-, and p-toluidine, alpha- and beta-naphthylamine, p-toluolsulphonamide, phenyl ureas, proteins (zein, casein), butyl amine, phenyl guanidine. The amount of these phenols and organic amines which may be used varies over a wide range, usually about 1% to 10% of the weight of the primary product being desirable.

Although water has been shown to be a desirable plasticizer for the primary product or primary plastic, we have found that oils of vegetable or mineral origin, such as pine oil, China-wood oil, castor oil, mineral oil, etc., will, when added to the dry primary plastic (dried to less than 1% moisture) in small proportions such as from ½% to 7%, particularly 1% to 3% produce a well flowed and complete molded product, without the use of water, which is stronger and frequently more water resistant than the moist-molded product. Paraffin wax and other waxes such as montan, carnauba and Japan, in similar amounts also may be used. A mixture of amines and oils is effective. The stearate does not seem necessary to secure release when paraffin wax is used.

We have also discovered that by the use of 1–7% of a mixture of cumar resin and an oil (such as those given above) in the proportion of 1:1 or 1.25:0.75, an even better molded product results.

When water or other volatile (at the molding temperature) material is the plasticizer, molding difficulties may be encountered because the volatiles must be permitted to escape. These volatiles can escape only with considerable difficulty in the larger molds and with great difficulty from wide boards or thick molded masses. It is apparent that the above-named plasticizers of low volatility in comparison with water and alcohol previously used for this purpose, have a number of advantages which make for a superior and practical material.

The following table is given as illustrative:

Table

Primary plastic is used throughout. In this case one cook was made in the usual manner using 5% $CaCO_3$ as buffer and portions of this cook molded with the various plasticizers listed.

| Kind of mold | Plasticizer additions | Type of flow | Modulus of rupture | Water absorption * |
|---|---|---|---|---|
| | | | | Per cent |
| 5% $H_2O$ | None | Complete | 6580 | 2.3 |
| Dry | do | Incomplete | 7896 | 4.72 |
| Do | 2% castor oil | Complete | 7050 | 2.19 |
| Do | 2% pine oil | do | 7332 | 1.7 |
| Do | 2% mineral oil | do | 6674 | 1.96 |
| Do | 2% tung oil | do | 6956 | 1.88 |
| Do | 2% cumar-tung oil (1:1) | do | 6956 | 1.87 |

NOTE.—In every case the added plasticizers give stronger, better flowed and more water resistant articles.
*Per cent gain after 24 hours complete immersion at room temperatures.

In the above description the primary lignocellulosic material is cooked in water, preferably buffered as described. The primary molding product thereby produced is somewhat deficient in plasticity and water resistance. This deficiency may be overcome by raising the lignin content of the primary product above the amount resulting from that occurring naturally in the lignocellulosic raw material in such a way as to insure a homogeneous lignin content. Although this increased lignin content may be obtained by mixing lignin produced separately to the primary material we prefer to obtain this increase by using as the cooking liquor the so-called "black-liquors" of wood pulping processes now used extensively in the paper industry. These black-liquors are rich in dissolved ligneous materials which appear more reactive chemically when utilized in this way than those resulting from the hydrolytic action of strong mineral acids on lignocelluloses. The ligneous material obtained directly from alcoholic or alkaline extracting mediums are particularly desirable. The use of these liquors does not entail any pre-purification before use and thereby obviates any possibility of lignin degradation.

The black liquor, for example, from the soda or sulfate process, if too alkaline is neutralized to the desired pH (between 4—9) by means of an acid such as sulfuric acid, the lignin adjusted as desired by the addition of water and the lignocellulosic material cooked therein as described above, preferably in the presence of a buffer. If the black liquor is neutral or acid, an alkaline material, such as calcium hydrate, may be added. Calcium carbonate also may be used. The lignin of the black liquor is thereby precipitated upon the natural lignocellulosic material. The dried primary product thereby produced has the necessary plasticity particularly if the pH of the cooking liquor is controlled as previously described. An added plasticizer is not required although the water content is substantially lower than 1% (drying at 110° C.). The primary product when hot-molded has excellent water resistance and strength.

The amount of lignin added varies with the desired results, the amount of lignin in the lignocellulosic material to which it is added and upon the source of the lignin. A smaller amount of lignin obtained from soda black liquor appears to be as effective as a larger amount from sulfate black liquor. For example, 10% of added lignin usually is effective, but the amount may vary over a wide range. Lignin obtained from a butanol cook seems to be as effective as that obtained from the sulfate process. The primary material containing the added lignin may be used for those products which are more difficult to mold, that is, for those usually requiring a material of high plasticity.

The primary product containing added lignins as described may be improved as to plasticity and strength by the addition of oils and waxes as described.

Following are specific examples which illustrate practical embodiments of our process so that those skilled in the art may practice it. The time of molding given is for articles about 0.10 to 0.20 inch thick. The invention is not limited to these specific examples.

(1) One part of maple sawdust is cooked with 1 part of water and 5% of calcium carbonate (of the weight of the air-dry sawdust) in an autoclave at a temperature of 185° C. for one hour, the pH at the end of the cook being about 5.5. The cooked material is filtered in a filter press and washed with water until the water solubles are removed. The pH should be within the range 5.5–7.0. The filter cake is dried at 110° C. to below 1% water. The dried material is divided into three parts after distintegrating to a 100-mesh powder in a mill. (a) The first part is mixed with about 2% pine oil and 1% zinc stearate, introduced into a cold mold and pressed at 7000 pounds per square inch. The pressure is then dropped to about zero and the mold is then heated to 185° C. The pressure in the mold is permitted to build up as a result of the temperature rise to 3000 pounds per square inch for 10 minutes. Cold ejection is used. (b) The second portion of powdered primary product is mixed with 2 per cent mineral oil and ½ per cent zinc stearate, introduced cold into a mold and prepressed at 6000 pounds per square inch and the mold heated to 170° C. for 10 minutes at this pressure after which it is cooled and the product ejected. (c) To the third portion 2 per cent of paraffin is added and the mixture pressed hot at 3300 pounds per square inch.

(2) One part of disintegrated corn cobs is cooked with 1 part of water at a temperature of 185° C. for one hour in the presence of 5 per cent sodium acetate as a buffer. The material is washed with water to a pH of 5.0–6.0 and after substantially all of the water solubles are removed, is filtered and then dried to less than 1 per cent $H_2O$. 5 per cent tung oil is then added. After being disintegrated to pass through a 65 mesh screen it is molded for 10 minutes at a temperature of 185° C. and at a pressure of 5000 pounds per square inch.

(3) One part of maple sawdust is mixed with one part of sulfate black liquor containing 10 per cent precipitable lignin, the alkali content of which is neutralized to about pH 5.5–6.5, by means of sulfuric acid. Some brown lignin substances may gel in the liquor. The mixture is cooked for one hour at 180° C. The pH should be between 5 and 5.5 at the end of the cook and preferably about 5.5. The resulting solids are washed thoroughly, dried, and ground through 60 mesh. The resulting primary product may be molded in the usual way with or without the addition of oils or waxes as set forth in the previous examples.

(4) One hundred fifty parts by weight of maple sawdust are mixed with 15 parts by weight of aniline. With this is mixed a cooking liquor consisting of 75 parts sulfate black liquor containing 10 per cent precipitable lignin, 75 parts additional water and enough sulfuric acid to bring the pH to 6.0–7.0. The mixture is cooked at 180° C. for one hour. The resulting solids are washed free of solubles and dried at 110° C. The mixture is molded hot after mixing it with 2% of Japan wax.

(5) The primary material of Example 1 after drying to 0.5% moisture is mixed with 2% pine oil and 2% aniline and molded at 185° C.

We claim:

1. In the preparation of a thermoplastic lignocellulosic material having the property of plastic flow under heat and pressure molding conditions of 185° C. and 3000 pounds per square inch with formation of hard, water-resistant, resin-like products by cooking a natural lignocellulosic material with water at a temperature of approximately 135° C. to 195° C. for approximately 15 minutes to an hour in the presence of an acid-neutralizing agent in an amount such as to produce a pH of approximately 5.0 to 6.0 in the cooked mass at the end of the cook to dissolve a part of the hemicelluloses and render said natural lignocellulosic material thermoplastic, leaching the cooked material until substantially all of the water-solubles have been removed, drying and reducing the leached material to a powder, the method of improving the plastic flow of said product under heat and pressure molding conditions which comprises adding to the dried material prior to the molding thereof, up to approximately 7% of a material from the group consisting of oils and waxes.

2. The method of claim 1 in which the added material is an oil.

3. The method of claim 1 in which the added material is a wax.

4. The method of claim 1 in which the added material is paraffin wax.

5. The method of claim 1 in which the material is dried to less than 1% of moisture.

6. In the preparation of a thermoplastic lignocellulosic material having the property of plastic flow under heat and pressure molding conditions of 185° C. and 3000 pounds per square inch with formation of hard, water-resistant, resin-like products by cooking a natural lignocellulosic material with water at a temperature of approximately 135° C. to 195° C. for approximately 15 minutes to an hour in the presence of an acid-neutralizing agent in an amount such as to produce a pH of approximately 5.0 to 6.0 in the cooked mass at the end of the cook to dissolve a part of the hemicelluloses and render said natural lignocellulosic material thermoplastic, leaching the cooked material until substantially all of the water-solubles have been removed, drying and reducing the leached material to a powder, the method of improving the plastic flow of said product under heat and pressure molding conditions which comprises adding to the dried material prior to the molding thereof, up to approximately 7% of a mixture of tung oil and cumar resin.

7. A comminuted material having the property of plastic flow under heat and pressure molding conditions of 185° C. and 3000 pounds per square inch with formation of hard, water-resistant, resin-like products, comprising a mixture of a treated natural lignocellulosic material and up to approximately 7% of a material from the group consisting of oils and waxes, said treated natural lignocellulosic material being substantially free of the water-solubles contained in a natural lignocellulosic material after being cooked with water at a temperature of approximately 135° C. to 195° C. for approximately 15 minutes to an hour in the presence of an acid-neutralizing agent in an amount such as to produce a pH of approximately 5.0 to 6.0 in the cooked mass at the end of the cook.

8. The comminuted material of claim 7 in which the added material is an oil.

9. The comminuted material of claim 7 in which the added material is a wax.

10. A hard, water-resistant, resin-like, thermoplastic molded product having a density of approximately 1.40 to 1.45, comprising a composition of a treated natural lignocellulose and up to approximately 7% of a material from the group consisting of oils and waxes, said composition having the property of plastic flow under heat and pressure molding conditions of 185° C. and 3000 pounds per square inch, said treated natural lignocellulose being substantially free of the water-solubles contained in a natural lignocellulose after being cooked with water at a temperature of approximately 135° C. to 195° C. for approximately 15 minutes to an hour in the presence of an acid-neutralizing agent in an amount such as to produce a pH of approximately 5.0 to 6.0 in the cooked mass at the end of the cook.

ARLIE W. SCHORGER.
JOHN H. FERGUSON.